(12) United States Patent
Boike et al.

(10) Patent No.: US 8,353,392 B2
(45) Date of Patent: Jan. 15, 2013

(54) INTERNALLY VENTED BRAKE DISK WITH IMPROVED HEAT DISSIPATION

(75) Inventors: Kevin Boike, Hermosa Beach, CA (US); Ryan L. Colburn, Los Angeles, CA (US)

(73) Assignee: SGL Carbon SE, Wiesbaden (DE)

( * ) Notice: Subject to any disclaimer, the term of this patent is extended or adjusted under 35 U.S.C. 154(b) by 1081 days.

(21) Appl. No.: 11/804,854

(22) Filed: May 21, 2007

(65) Prior Publication Data

US 2008/0289918 A1    Nov. 27, 2008

(51) Int. Cl.
*F16D 65/847* (2006.01)
(52) U.S. Cl. ............... 188/264 A; 188/218 XL
(58) Field of Classification Search ........ 188/18 A, 188/218 XL, 264 A, 264 AA, 71.6; 192/113.22
See application file for complete search history.

(56) References Cited

U.S. PATENT DOCUMENTS

| | | | |
|---|---|---|---|
| 3,743,187 A * | 7/1973 | Breunsbach | 239/489 |
| 7,059,456 B2 * | 6/2006 | Winklemann et al. | 188/264 AA |
| 2003/0118757 A1 | 6/2003 | Bauer et al. | |
| 2004/0035659 A1 * | 2/2004 | Pacchiana et al. | 188/264 R |
| 2005/0051393 A1 | 3/2005 | Winkelmann et al. | |
| 2008/0145236 A1 * | 6/2008 | Liang | 416/97 R |

FOREIGN PATENT DOCUMENTS

| | | | |
|---|---|---|---|
| DE | 4430280 A1 * | 2/1996 | |
| DE | 102004056645 A1 * | 6/2006 | |
| EP | 1 462 672 A2 | 9/2004 | |
| WO | WO 2005066516 A1 * | 7/2005 | |

* cited by examiner

*Primary Examiner* — Robert A Siconolfi
*Assistant Examiner* — Vu Q Nguyen
(74) *Attorney, Agent, or Firm* — Laurence A. Greenberg; Werner H. Stemer; Ralph E. Locher

(57) ABSTRACT

A vented brake disk has improved heat dissipation by cooling channels that extend from an inner circumference to an outer circumference and the channel walls of which are formed with flow obstructions in the form of a female thread.

12 Claims, 3 Drawing Sheets

INTERNALLY VENTED BRAKE DISK WITH IMPROVED HEAT DISSIPATION

BACKGROUND OF THE INVENTION

Field of the Invention

The invention relates to internally ventilated brake disks with enhanced transfer of heat.

Internally vented brake disks have the shape of an annular disk with cooling channels extending through the interior of that annular disk from its inner to its outer circumference.

Such a vented brake disk is known, for example, from commonly assigned U.S. patent application US 2005/0051393 A1. The cross section and the course of the cooling channels within the brake disk are designed such that the cooling effect by means of air flow is improved. This is achieved by providing cooling channels which are branched from the inside to the outside of the brake disk such that one channel opening on the inner circumference is connected with at least two channel openings on the outer circumference, and by providing cooling channels with a ratio of the total surface Fa of the cross section of the openings of channels lying on the outer circumference to the total surface Fi of the cross section of the openings of the channels lying on the inner circumference amounting to Fa:Fi=0.1 to 1.07. Preferably, the ratio Fa:Fi is smaller than 1, i.e. the cross section of cooling channels decrease from the inner to the outer circumference of the brake disk. Furthermore, the cooling channels may have a curvature.

Another solution to the problem of enhancing the heat removal is disclosed in the commonly assigned European patent application EP 1 462 672. There, the cooling channels are provided with flow obstruction elements causing turbulence in the air flowing through the channels. The obstruction elements may have the shape of knobs or of vanes extending from the bottom of the cooling channel. Another kind of obstruction elements are ridges extending vertically or horizontally across the cross section of a cooling channel, thereby splitting the air stream flowing along that cooling channel and introducing turbulence.

Such a brake disk can be obtained by joining two half disks having grooves on those surfaces which abut each other after joining. In the joined state, the grooves on the abutting surfaces of the half disks cooperate to form the cooling channels. The obstruction elements have to be preformed within the grooves of at least one of the half disks, or they are obtained by positioning an appropriately formed insert between the half disks which are joined. To facilitate joining of the half disks, protrusions and recesses, which mate upon joining, are provided on the abutting surfaces. This method is suitable for both metallic and ceramic brake disks.

However, for ceramic materials, especially fiber-reinforced ceramics, a single-piece molding method is preferred. The molding composition is poured in a mold provided with cores placed at the locations of the cooling channels. The shape of the cores corresponds to the shape of the cooling channels to be formed, i.e. the cores are provided with recesses corresponding to the desired obstruction elements like knobs, vanes etc. After molding, the brake disk is cured, carbonized and if necessary further densified by impregnation or chemical vapor deposition to obtain a carbon fiber-reinforced carbon (CFRC) composite. Optionally, the CFRC is transferred into a carbon fiber reinforced silicon carbide (C/SiC) by infiltration with silicon.

The prior art solutions reside in providing specially-designed cooling patterns, thus imposing limitations regarding geometry and other design considerations. It is therefore desirable to provide a solution which can be applied to any cooling pattern regardless of its particular geometry, and can be used as an additive effect on vent cooling, rather than a feature that must be designed around.

Another drawback of the prior art is the application of obstruction elements. Such obstruction elements, if not designed and adjusted very accurately, might tend to impede the overall cooling flow instead of merely creating turbulence as originally desired. Therefore, it is desirable to create a cooling channel structure which acts specifically to modify the flow on the boundary layers of the air stream thus facilitating heat removal from the brake material, and transfer of the heat into the air stream flowing through the vent.

BRIEF SUMMARY OF THE INVENTION

It is accordingly an object of the invention to provide an internally vented brake disk having cooling channels, wherein the walls of those cooling channels have a structure which enhances the heat removal by introducing turbulence in the air flowing through the channels, which overcome the hereinafore-mentioned disadvantages of the heretofore-known products of this general type.

With the above and other objects in view there is provided, in accordance with the invention, a vented brake disk with improved heat dissipation, comprising:

a substantially circular, annular brake disk body formed with an inner circumferential surface and an outer circumferential surface;

at least one cooling channel formed inside the brake disk body and extending from the inner circumferential surface to the outer circumferential surface; and a multiplicity of substantially evenly distributed flow obstructions formed on a channel wall bounding the at least one cooling channel.

In accordance with a preferred embodiment of the invention, the flow obstructions are crests and troughs formed in the channel wall of the cooling channel. Such crests and troughs are suitably formed by tapping a helical thread into at least portions of the channel. The threads not only form flow obstructions per se, but they also increase the area of the heat dissipation surface from the brake disk body to the cooling channel. The heat exchange properties are thus further improved.

In other words, the objects of the invention are achieved by providing an annular brake disk having an inner circumference and an outer circumference and at least one cooling channel extending in the interior of the brake disk from the inner to the outer circumference of the annular brake disk, the cooling channel being surrounded by a wall, with at least a portion of the wall of the at least one cooling channel of the brake disk being furnished with a structure comprising a female thread.

In one embodiment, the brake disk is provided with a plurality of the cooling channels, with at least a portion of the wall of at least one of the cooling channels of the brake disk being furnished with a structure comprising a female thread.

In one embodiment, the thread extends continuously over the channel wall from the inner to the outer circumference of the brake disk.

For a large number of applications the structure in accordance with the invention can be advantageously obtained by very simple techniques, such as a very facile drilling technique.

In accordance with an added feature of the invention, the flow obstructions are defined by a helical thread formed in the cooling channel.

In accordance with an additional feature of the invention, the troughs are defined by a uniform diameter, at least within a given section of the cooling channel, and the crests have an increasing height relative to the troughs in the given section of the cooling channel. In other words, the crests may be truncated in specific areas of the cooling channel. When such a truncated thread is applied, machining of the thread does not extend as deep into the disc from the vent hole as it is the case for a non-truncated thread. Thus there is less risk to impair the strength of the disk by machining the threads. Also, varying the depth of the thread enables a variation of the ratio between turbulent and laminar flow through the channel.

In accordance with another feature of the invention, there is provided a scallop-shaped opening at the inner circumferential surface and continues with a substantially uniform diameter from the scallop-shaped opening to the outer circumferential surface. The scallop-shaped opening acts similarly to a funnel. It is further preferably for the cooling channel to be widened towards the outer circumferential surface. This can be achieved by an additional bore formed adjacent a bore defining the cooling channel at the outer circumferential surface and merging into the cooling channel inside the disk body approximately centrally between the inner and outer circumferential surfaces.

Preferably, a plurality of cooling channels extend substantially radially from the inner circumferential surface to the outer circumferential surface. Alternatively (or in addition), the cooling channels extend substantially linearly from the inner circumferential surface to the outer circumferential surface and enclose an angle of between 1° and 55° with a radial direction.

In accordance with a further feature of the invention, the cooling channels are formed with a scallop-shaped opening at the inner circumferential surface and a plurality of bores of substantially uniform diameter extending from a common bore at the scallop-shaped opening and spreading apart in fan shape and issuing separately at the outer circumferential surface.

In accordance with again an added feature of the invention, the cooling channel is a bore drilled into the disk brake body and the flow obstructions are a female thread subsequently machined into the bore.

In accordance with again an additional feature of the invention, the brake disk body is formed of a ceramic material. The ceramic of the preferred embodiment is a carbon fiber reinforced carbon composite or a carbon fiber reinforced silicon carbide.

The brake disk body may be formed of two mirror-symmetric, mating half disks. In the alternative, the brake disk body is an integrally molded mass and the cooling channels are formed therein by lost core molding.

In accordance with a concomitant feature of the invention, the cooling channels are curved from the inner circumferential surface to the outer circumferential surface.

Other features which are considered as characteristic for the invention are set forth in the appended claims.

Although the invention is illustrated and described herein as embodied in internally vented brake disk with improved heat transfer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
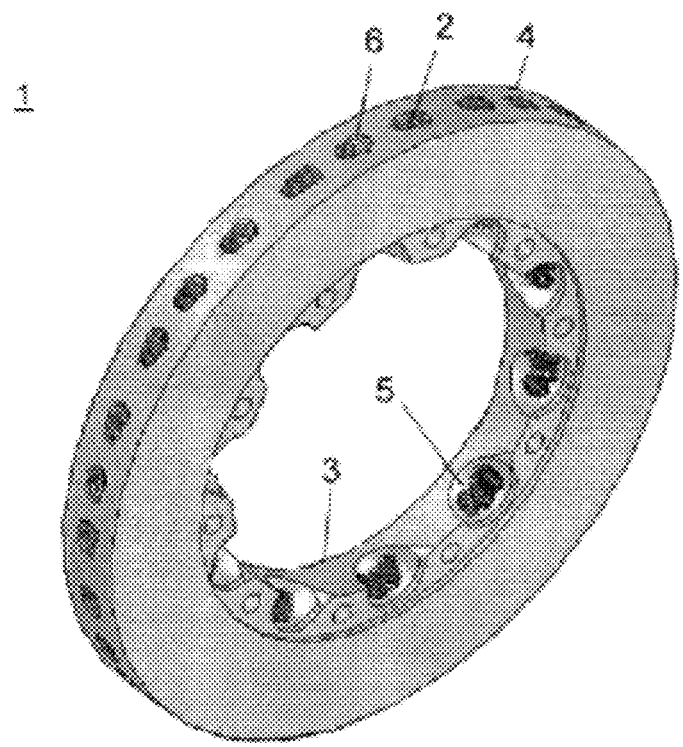
FIG. 1 is a perspective view of a brake disc according to the invention with a plurality of cooling channels.
Figure 2:
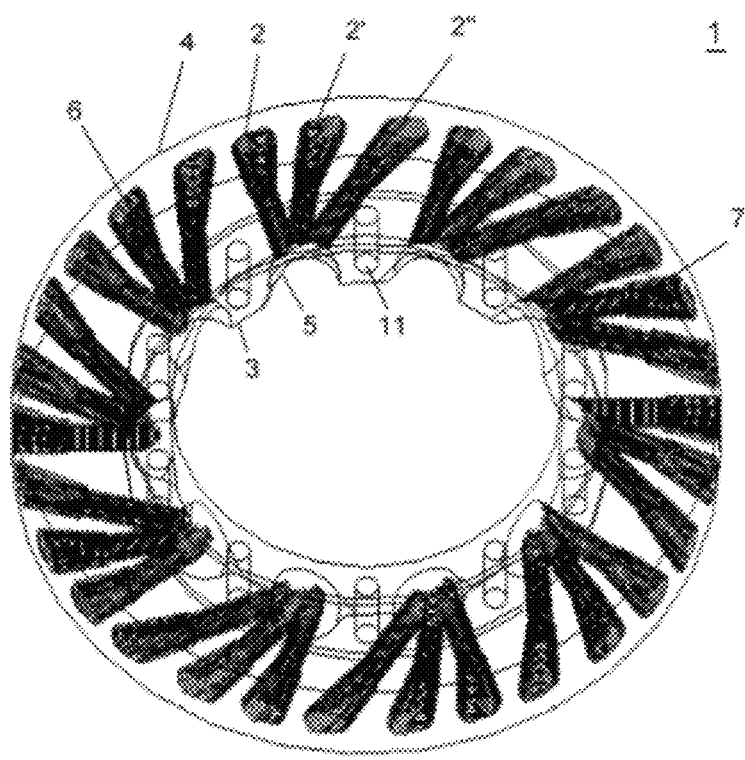
FIG. 2 is an X-ray-type perspective view showing the interior of a brake disk according to an exemplary embodiment of the present invention.

Referring now to the figures of the drawing in detail and first, particularly, to FIGS. 1 and 2, the brake disk 1 of the invention has the annular structure known in the art with at least one cooling channel 2 extending from the inner circumference 3 to the outer circumference 4 of the annular brake disk 1. At the inner circumference 3, each cooling channel 2 leads into a funnel, or scallop-like extension 5. The opening of the cooling channel 2 at the outer circumference 4 is identified with reference numeral 6. The mounting section of the brake disk is indicated at 11.

Preferably, there is provided a plurality of such cooling channels 2, 2', 2''.

At least a portion of the wall of at least one of the cooling channels is structured by a helical groove engraved in that wall. Preferable the walls of all cooling channels 2, 2', 2'' are provided with thread-like structures 7 as can be seen in the interior view of FIG. 2.

Figure 3:
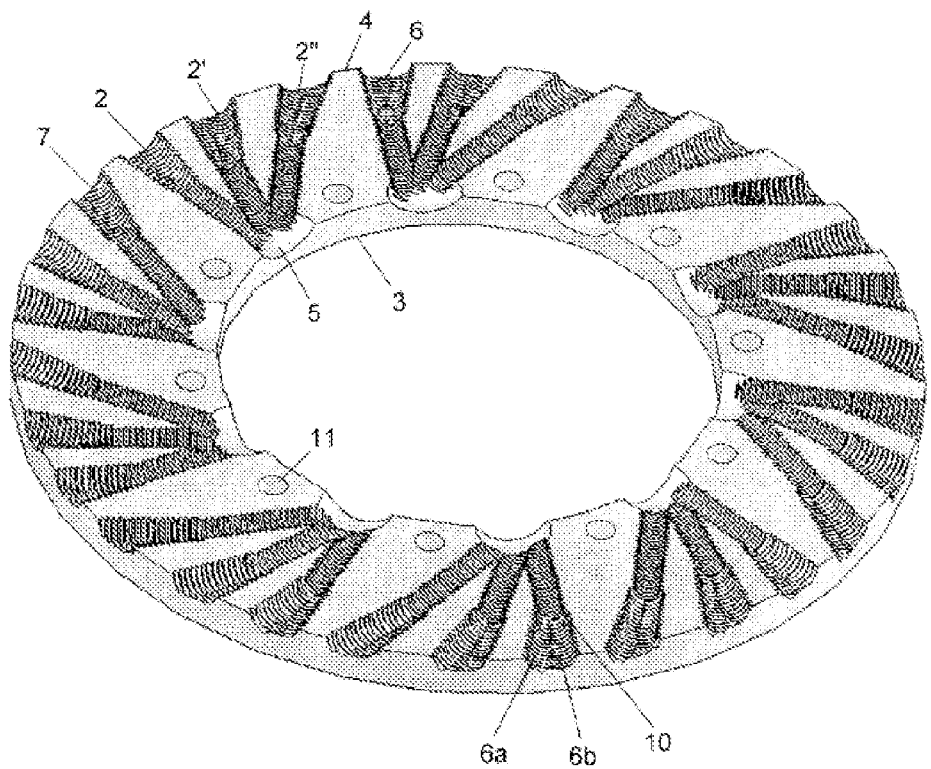
FIG. 3 is a perspective view of a cross section through the brake disk shown in FIGS. 1 and 2 cut along a midplane of the cooling channels.
Figure 4:
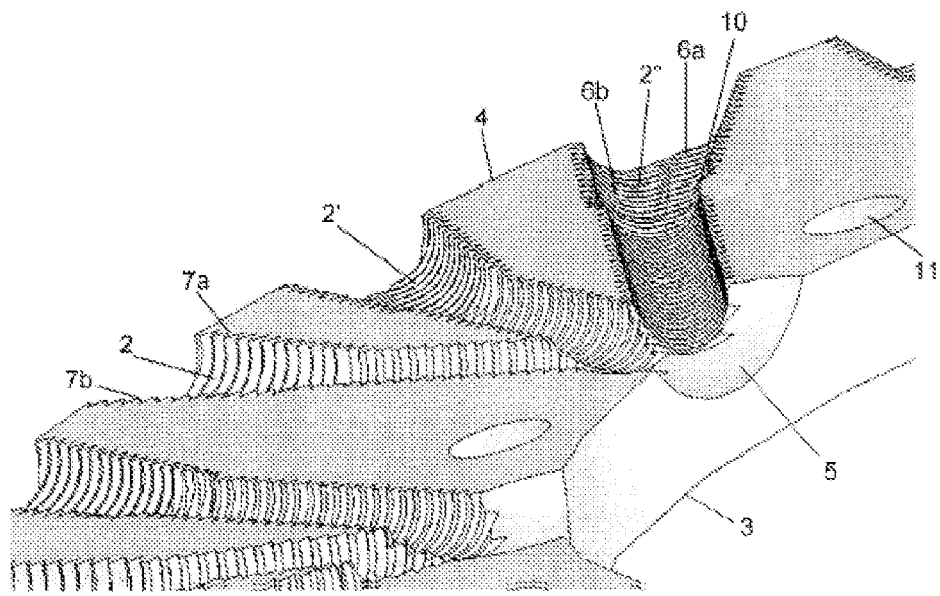
FIG. 4 is a perspective view of a detail of FIG. 3.

Details of the thread-like structures provided on the walls of the cooling channels 2, 2', 2'' are shown in FIGS. 3 and 4. There, FIG. 3 displays the cross-section of the brake disk 1 shown in FIGS. 1 and 2, as it would be visible when cutting the brake-disk 1 along the midplane of the channels 2, 2', 2'' into two annular half disks. FIG. 4 shows a detail from FIG. 3.

In this embodiment, the wall of each of the cooling channels 2, 2', 2'' is structured by a continuous helical groove 7a engraved in that wall. The helical groove 7a extends along the wall of each of the channels 2, 2', 2'', creating there a continuous profile with a plurality of pronounced upward and downward steps. When air flows through the cooling channels 2, 2', 2'', eddies (turbulences) are formed at the apexes of the crests 7b (i.e., ridges) protruding between the successive turn of the thread groove 7a. Those turbulences facilitate removal of heated air from the walls of the cooling channels 2, 2', 2'' and enhance removal of the heat generated upon braking. The turbulences facilitate transfer of the heated air into the air stream flowing through the vent channel.

The threaded structure may be obtained by machining the thread 7 into the walls of the blank cooling channels with a die known in the art as a screw tap, i.e. a drilling tool provided with a male thread like a screw. When such tool is applied to the cooling channels 2, 2', 2'', a female thread 7 that is complementary to the male thread provided on the tap is machined into the channel wall. Thread-drilling with a tap allows machining reproducible and even structures on the walls of the cooling channels 2, 2', 2".

In the case of curved cooling channels, at least portions of the walls of the cooling channels may be provided with a threaded structure by introducing the drilling tap into the channel 2 and threading the channel wall as far as the curvature allows. Those portions of the cooling channel which cannot be reached by the tap remains non-threaded. The tap may be applied from the outer circumference 4 and also from the inner circumference 3 if the width of the latter allows application of the tap. In this case, a cooling channel 2 is obtained with a first threaded portion extending from the outer circumference 4, a second threaded portion extending form the inner circumference 3 and a non-threaded innermost portion between the threaded portions. If it is not possible to apply a drilling tap from the inner circumference, than a cooling channel might be obtained having a threaded portion extending from the outer circumference into the curved cooling channel, and a non-threaded portion extending from the inner circumference into the curved cooling channel.

The technique of providing a thread-like structure at the walls of the cooling channels by drilling is suitable for brake disks made of any known brake disk material which can be machined by means of drilling, or which can undergo any other process which will have an effect on the geometric profile of the walls of the cooling channels.

The drilling technique is especially suitable for brake disks made of ceramic materials like carbon fiber reinforced composites, e.g. carbon fiber reinforced carbon composites and carbon fiber reinforced silicon carbide. Preferably, drilling of the channels and tapping is carried out before the CFRC is re-densified by re-impregnation and/or CVD. In the case that carbon has deposited in the groove of the thread, this can be removed by re-working (re-tapping) the thread. Alternatively, the threading or tapping is carried out post densification as a final machining step.

If necessary, the brake disks with the drilled and tapped channels can be infiltrated with silicon to obtain a C/SiC composite (carbon fiber-reinforced ceramics with a matrix containing silicon carbide and optionally excess silicon and/or non-reacted carbon).

A brake disk with blank (i.e. non-threaded) cooling channels can be manufactured by any technique known in the art, like forming a massive one-piece disk into which blank cooling channels are drilled, forming two half disks having grooves on their surfaces which after joining the half disks abut, thus forming the cooling channels, or by molding technique using a mold with appropriate cores (inserts).

The lost-core technique disclosed e.g. in the above-mentioned, commonly assigned US patent application 2003/0118757 is considered especially suitable. There is disclosed a process for producing hollow bodies of fiber-reinforced ceramic materials, where cores whose shape corresponds to that of the hollow spaces to be formed are produced in a first step, a green body is produced in a second step by introducing the pre-shaped cores and a molding compound into a mold, where the molding compound comprises carbon fibers and pitch and/or resins, the green body is cured in a third step by heating under pressure, the cured green body is carbonized in a fourth step by heating in the absence of oxidants to form a CFRC body, and, if desired, the CFRC body is infiltrated with molten metal, especially molten silicon in a fifth step with retention of its shape, with at least partial formation of carbides occurring. The cores comprise a material, which in the fourth step melts without decomposition at a temperature above the curing temperature of the molding compound. A suitable material for the cores is a thermoplastic polymer.

In other embodiments of this method, the cores are made from a material which is compressed, decomposed, evaporated, burnt out or pyrolyzed during the heat treatment applied in the processes of carbonization, thus leaving hollow spaces corresponding to the cooling channels.

Figure 5:
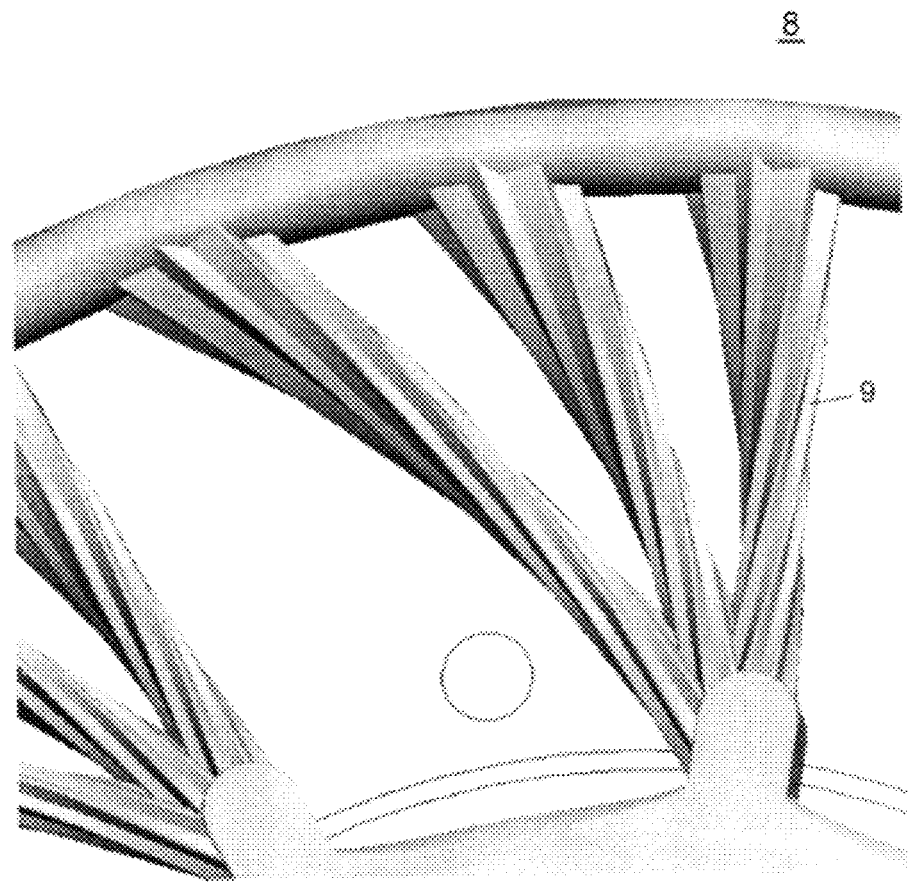
FIG. 5 is a molding insert which can be used in the production of the brake disk according to the present invention.

It is also possible to apply lost cores (inserts made from a material which is compressed, decomposed, evaporated, burnt out or pyrolyzed during the heat treatment applied in the processes of carbonization) with a surface which has a male thread like a screw. FIG. 5 shows such an insert 8 comprising a plurality of radial-extending portions 9 each provided with a screw-like structure (male thread). The position, shape and extension of the radial portions 9 correspond to the position, shape and extension of the cooling channels to be formed in the brake disk.

In this way, cooling channels the walls of which have a female thread structure which is complementary to the male thread provided on the surfaces of the radial portions 9 of the molding insert 8 are obtained directly by molding. This technique makes it possible to apply the advantageous threaded structure of the present invention to cooling patterns including channels which are not easily accessible for a drilling tap, e.g. cooling channels which are curved or otherwise do not extend in a straight manner from the inner circumference to the outer circumference of the annular brake disk.

The brake disk 1 may have up to 80 cooling channels 2, 2', 2", at least one of those cooling channels being provided with the threaded wall structure in accordance with the invention. Commonly, brake disks are provided with at least three cooling channels. In most to cases, the number of channels is between 20 and 40. To ensure homogeneous cooling, preferably the cooling channels are quite evenly distributed over the circumference of the annular disk.

It is also common to arrange the channels in such way that two, three or four channels 2', 2', 2" extend from one scallop 5 on the inner circumference 3 of the brake disk 1. The scallop 5 forms a common inlet for the air flowing through the channels 2', 2", 2''' extending from the scallop 5 to the outer circumference 4 of the annular brake disk 1, see FIGS. 2 and 3.

The channel diameter is typically in the range of 8 to 10 mm.

The thread pitch (number of threads per inch) of the thread 7 engraved in at least a portion of the wall of at least one of the cooling channels 2, 2', 2" can vary in a wide range from around 0.05 threads per inch up to 50 threads per inch. More preferably, the thread pitch is selected from the range between 0.14 and 24 threads per inch, whereas the invention is not limited to a special value or range of the thread pitch. Within a brake disk, the cooling channels 2, 2', 2" may have different thread pitches.

In one embodiment, the cooling channels extend in the radial direction from the inner to the outer circumference of the brake disk, thus providing the shortest connection between outer and inner surface.

In another embodiment, the direction of at least one of the cooling channels deviates from the radial direction. The deviation may be by an angle which enclosed up to 55° with the radial direction or with the at least one cooling channel that is linear. In this way, the extension of the cooling channels within the brake disk is longer, thus increasing the surface of the cooling channel walls available for the heat removal.

In one embodiment the diameter of a cooling channel does not change along the length of the channel so that the opening of the channel at the inner circumference has the same cross section like the opening of the same channel at the outer circumference of the brake disk.

In another preferred embodiment, at least one of the cooling channels has openings at the outer circumference having a larger cross section than the openings of the same channels at the inner circumference of the annular brake disk. This applies to the embodiment shown in FIGS. 2, 3 and 4.

The larger channel opening 6 at the outer circumference 4 is obtained by drilling two circular holes side by side an the outer circumference 4, so that the holes overlap and merge into an elongated, oval opening 6. The holes are drilled under different angles related to the radial direction, so that a first bore 6a extending from a first of the of the two overlapping holes runs towards a second bore 6b extending from the other of the two overlapping holes and finally the first bore 6a leads into the second bore 6b which extends further toward the inner circumference 3 of the annular brake disk 1. These two bores 6a, 6b form a cooling channel 2 with a cross section decreasing from the outer circumference 4 towards the inner circumference 3 of the brake disk 1. At the outer circumference 4 of the brake disk 1, the cross section of the cooling channel is equal to the cross section of the oval opening 6 formed by the two overlapping holes. Due to the different directions of the bores 6a and 6b, the cross section of the cooling channel 2 formed by the two bores 6a and 6b decreases into the bulk of the brake disk 1 towards intersection point 10 where the first bore 6a extending from the first hole leads into the second bore 6b extending from the second hole. From the point of intersection 10 of the two bores 6a and 6b to the inner circumference 3 of the brake disk 1, the cross section of the cooling channel 2 remains constant (equal to the cross section of the second bore 6b).

By expanding the cross sectional area of a cooling channel from the inner to the outer circumference of the brake disk, the mass of air flowing through said channel must also expand, thereby cooling the air and enabling removal of additional heat.

A second advantage to this type of construction with increased open area and therefore, increased removal of material at the outer circumference is that it allows for more of the brake disk material to remain near the critical load bearing region (close to the mounting area 11 which is located near the inner circumference 3).

Of course, more than two overlapping holes and intersecting bores can be combined, thus forming a funnel-like extension of the cross section of the cooling channel toward the outer circumference of the annular brake disk.

Figure 6:
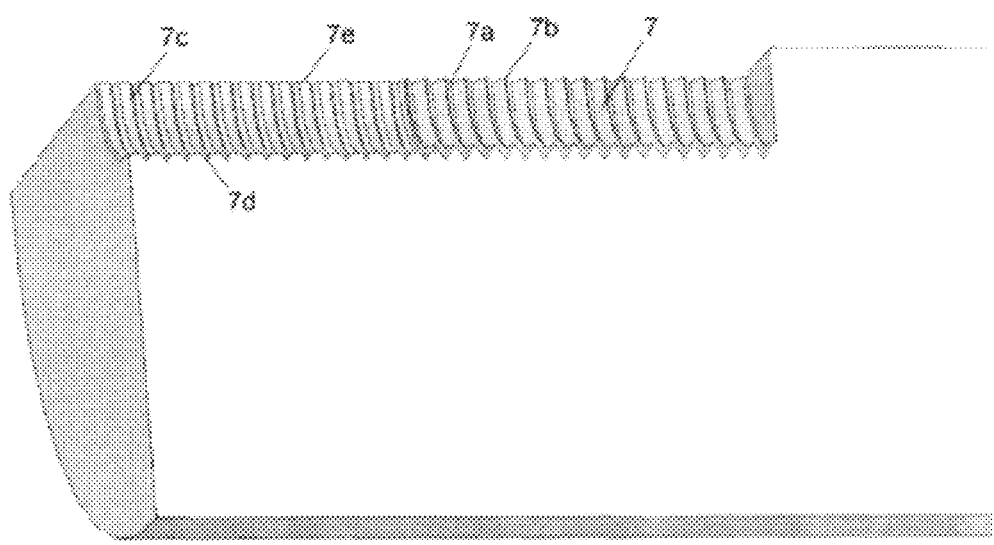
FIG. 6 is a detail section according to another preferred embodiment of the invention.

In another preferred embodiment according to FIG. 6, at least in a part of the cooling channel 2, the thread 7 is truncated. A truncated thread 7c is obtained when a tap is used which does not exactly fit to the diameter of the cooling channel 2, but is somewhat undersized in relation to the diameter of the cooling channel. Thus only the very apex of the helical crest of the male thread on the tap reaches the wall of the cooling channel where a narrow helical groove 7d is engraved. However, the bottom portion of the male thread on the tap is distant from the channel wall. Therefore, the portion 7e of the channel wall beside the helical groove 7d is not touched by the tap and remains flat.

When such a truncated thread is applied, machining of the thread does not extend as deep into the disc from the vent hole as it is the case for a non-truncated thread. Thus there is less risk to impair the strength of the disk by machining the threads.

Furthermore, varying of the depth of the thread, as may be affected by truncating the thread enables variation of the ratio between the turbulent and the laminar flow (with the term laminar flow deemed to include pseudo-laminar flow) through the channel. Different ratios of these types of flow will dictate the cooling efficiency (this will be different for different vehicles), as well as the "shape" or type of the flow as it exits the cooling channel and enters back into the aerodynamic flow around the vehicle.

It should be understood that the features of several of the embodiments described above might be combined, as it is done in the brake disk 1 shown in FIGS. 2 through 4.

Furthermore, it is easily understood that the invention is not limited to a certain number, diameter or direction of the cooling channels.

Although the invention is described herein as embodied in an internally vented brake disk having an inner circumference and an outer circumference and at least one cooling channel extending in the interior of said brake disk from said inner to said outer circumference of said annular brake disk, said cooling channel being surrounded by a wall, with at least a portion of the wall of said at least one cooling channel of said brake disk being furnished with a structure comprising a female thread, it is nevertheless not intended to be limited to the details given, since various modifications and structural changes may be made therein without departing from the spirit of the invention and within the scope and range of equivalents of the claims.

The invention claimed is:

1. A vented brake disk with heat dissipation, comprising:
a substantially circular, annular brake disk body formed with an inner circumferential surface and an outer circumferential surface;
at least one cooling channel formed inside said brake disk body and having a length extending from said inner circumferential surface to said outer circumferential surface, said cooling channel having an opening formed at said outer circumferential surface, said cooling channel having a cross sectional area increasing incrementally over only a portion of said length of said cooling channel in a direction from said inner circumferential surface to said outer circumferential surface, the incremental increase of said cross sectional area being defined by overlapping bores directed at different angles with respect to one another, said bores overlapping up to said opening; and
a multiplicity of substantially evenly distributed flow obstructions formed on a channel wall bounding said at least one cooling channel, said flow obstructions being defined by a helical thread formed in said cooling channel.

2. The brake disk according to claim 1, wherein said flow obstructions are crests and troughs formed in said channel wall of said cooling channel.

3. The brake disk according to claim 2, wherein said troughs are defined by a uniform diameter, at least within a given section of said cooling channel, and said crests have an increasing height relative to said troughs in said given section of said cooling channel.

4. The brake disk according to claim 1, wherein said at least one cooling channel is one of a plurality of cooling channels extending substantially radially from said inner circumferential surface to said outer circumferential surface.

5. The brake disk according to claim 1, wherein said at least one cooling channel is one of a plurality of cooling channels extending substantially linearly from said inner circumferential surface to said outer circumferential surface and enclosing an angle of between 1° and 55° with a radial direction.

6. The brake disk according to claim 1, wherein the cooling channel is a bore drilled into said disk brake body and said flow obstructions are a female thread subsequently machined into said bore.

7. The brake disk according to claim 1, wherein said brake disk body is formed of a ceramic material.

8. The brake disk according to claim 7, wherein said brake disk body is formed of a material selected from the group consisting of a carbon fiber reinforced carbon composite and carbon fiber reinforced silicon carbide.

9. The brake disk according to claim 1, wherein said brake disk body is formed of two mirror-symmetric, mating half disks.

10. The brake disk according to claim 1, wherein said brake disk body is an integrally molded mass and said cooling channel is formed therein by lost core molding.

11. The brake disk according to claim 10, wherein said cooling channel is curved from said inner circumferential surface to said outer circumferential surface.

12. A vented brake disk with heat dissipation, comprising:
a substantially circular, annular brake disk body formed with an inner circumferential surface and an outer circumferential surface;
at least one opening formed in said inner circumferential surface, a plurality of cooling channels each beginning at said opening and extending from said opening to said outer circumferential surface;
each of said plurality of cooling channels having a respective cross sectional area, said cross sectional area increasing incrementally over a portion of a length thereof in a direction from said inner circumferential surface to said outer circumferential surface, the incremental increase of each said respective cross sectional area being defined by overlapping bores directed at different angles with respect to one another, said bores overlapping up to said outer circumferential surface; and
a multiplicity of substantially evenly distributed flow obstructions formed on channel walls, said walls each bounding a respective one of sai plurality of cooling channels, said flow obstructions being defined by a helical thread formed in said plurality of cooling channels.

* * * * *